INVENTOR.
OLE GRANNING

BY

ATTORNEYS

April 30, 1968 O. GRANNING 3,380,758
AIR LIFT FIFTH WHEEL CONTROL SYSTEM
Filed March 2, 1966 4 Sheets-Sheet 2

INVENTOR.
OLE GRANNING
BY
ATTORNEYS

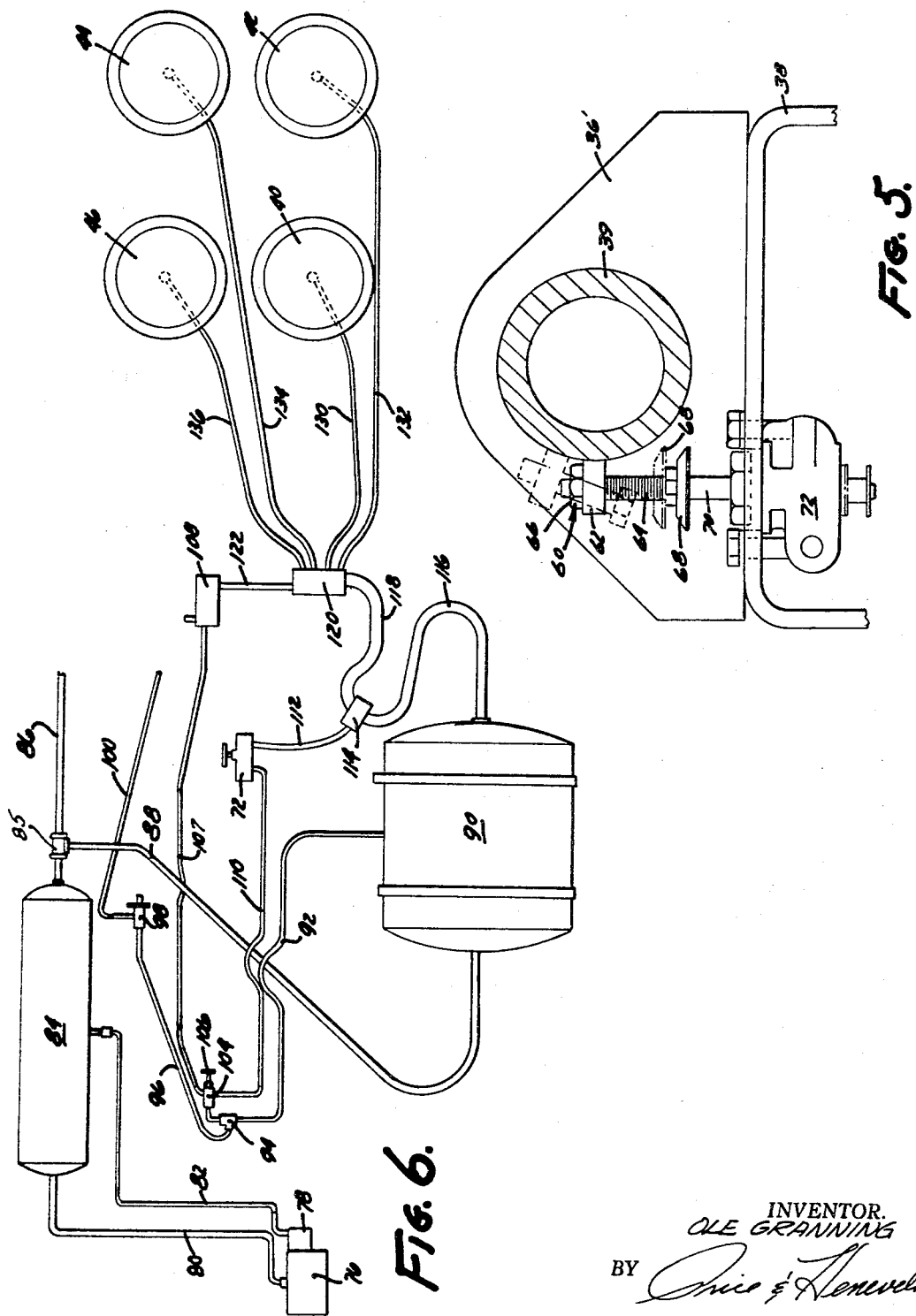

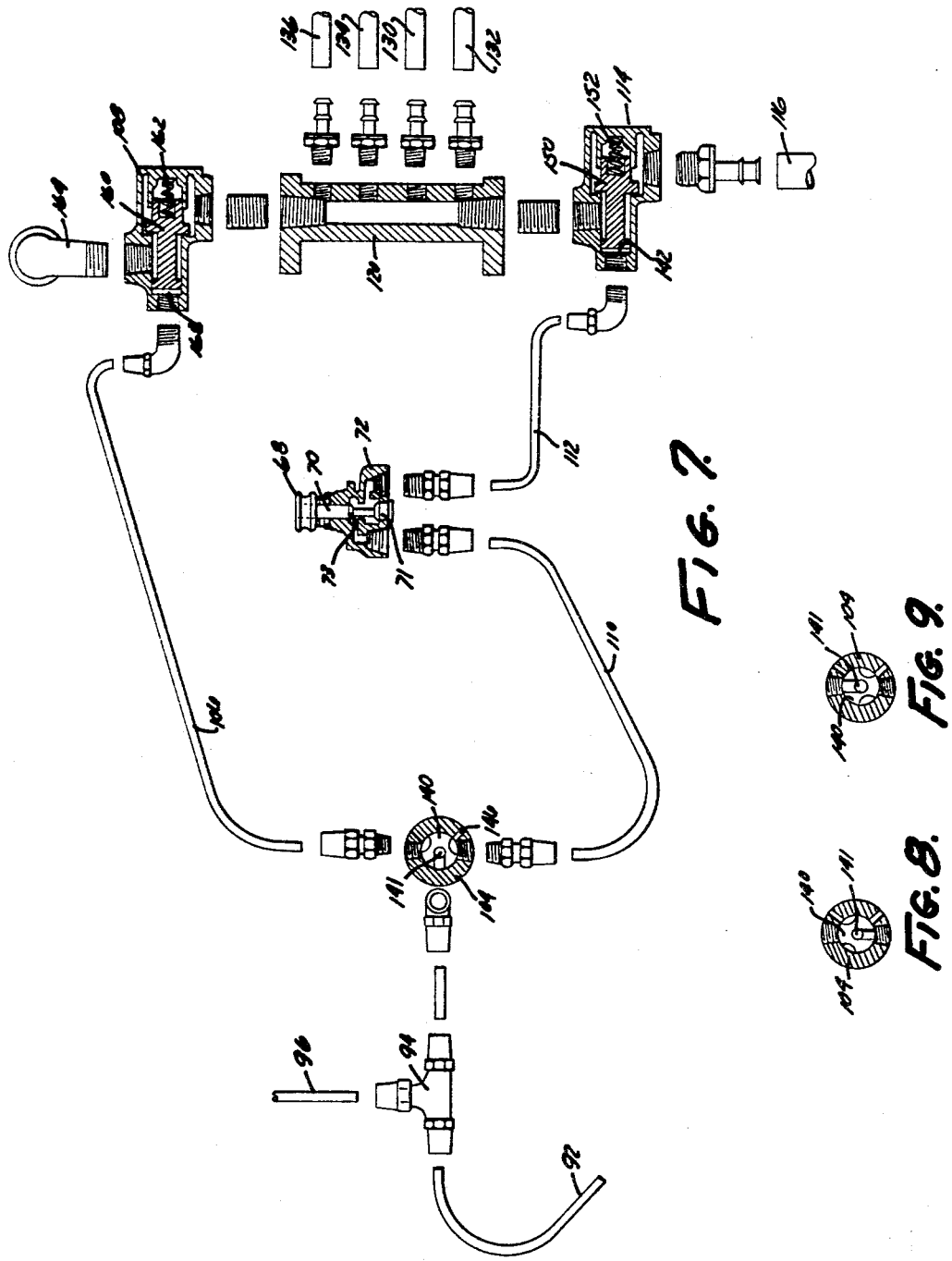

United States Patent Office 3,380,758
Patented Apr. 30, 1968

3,380,758
AIR LIFT FIFTH WHEEL CONTROL SYSTEM
Ole Granning, Detroit, Mich., assignor to Ole Granning Trailer Service Inc., Dearborn, Mich, a corporation of Michigan
Filed Mar. 2, 1966, Ser. No. 531,277
3 Claims. (Cl. 280—425)

ABSTRACT OF THE DISCLOSURE

A fifth wheel assembly having inflatable hoisting elements, the inflation, air retention, and exhaust of which are controlled by manually operated valve means, with the system also including an elevation limiting, pre-set, automatically actuated, overriding control valve unit which overrides the effect of the manual valve during inflation of the hoisting elements to limit inflation and fifth wheel elevation.

This invention relates to a tractor-trailer fifth wheel hitch assembly, and more particularly to a uniquely controlled pneumatic lift fifth wheel assembly.

The apparatus disclosed herein is an improvement on the apparatus disclosed and claimed in co-pending application, Ser. No. 362,008, filed Apr. 23, 1964, now U.S. Patent No. 3,253,840, entitled Pneumatic Lift System for a Tractor-Trailer Hitch, by Ole Granning, the inventor herein.

This invention has many related uses, but was primarily invented for use in very short haul environments such as in the yards of freight terminals. The pneumatic lift system enables the tractor driver to connect to a trailer, hoist it, move it, lower it, and disconnect it without disembarking from the tractor cab to crank the landing gear up and down as is usually necessary.

In actual practice, the apparatus disclosed in the above identified patent application has been found to work very effectively for this purpose and related purposes.

However, since trailers invariably have substantially different weight loads, and since the air pressure needed in the pneumatic bellows systems under the fifth wheel to lift these different loads varies substantially, it was found that the drivers using the new system, in order to be assured that they were hoisting the trailer sufficiently high enough to lift the landing gear, were frequently applying more pressure to the bellows than necessary for the particular load involved. This resulted in a sudden, unrestrained upward thrust by the inflated bellows, often causing series buckling damage to the support plate between the bellows and the fifth wheel, and serious damage to other cooperative components of the assembly. The potential for equipment damage is particularly great when no trailer at all is on the fifth wheel, as can occur by accidental actuation of the pneumatic inflation apparatus.

Another problem commonly encountered with the new system occurs where a particular overhead height limitation exists. For example, a yard or terminal frequently has overhead obstructions which must be cleared by the top of the semi-trailer. The driver must, therefore, be extremely careful not to hoist the trailer above this level. In actual operation, however, this is a very tricky task particularly since the trailer loads vary significantly. As can be readily understood, the driver's enthusiasm to hoist the landing gear off the ground sufficiently to avoid damage to it by hitting ground obstructions causes him to over-inflate the bellows and thereby over-hoist the trailer to create the danger of damage to overhead obstructions.

It is an object of this invention to provide a uniquely controlled pneumatic lift fifth wheel system for a tractor-trailer hitch assembly, achieving optimum lifting action regardless of the load contained in a particular trailer or series of trailers, or even whether no trailer at all is attached to the fifth wheel.

Another object of this invention is to provide an automatically controlled, pneumatic lift system for a fifth wheel hitch assembly, enabling dependable repeated hoisting of different trailers to an optimum height, for proper clearance of the landing gear off the ground, yet leaving proper clearance between the top of the trailer and overhead obstructions.

Another object of this invention is to provide a controlled hoist, pneumatic, air bag lift fifth wheel system causing repeated hoisting of trailers to a specific, definite, safe height which may be pre-selected to suit the particular surroundings involved, yet without the driver ever debarking from the cab. The apparatus enables the driver to initially make a setting very simply, easily and quickly for a specific pre-set trailer hoisting height, with the setting holding for any and all trailers hoisted on the fifth wheel, regardless of the load contained in the trailer. The setting can moreover be easily changed at any time as desired by the driver, merely by a simple adjustment. The system not only has this automatic hoisting level control, but also allows manual control of hoisting from the cab, to raise and lower the fifth wheel, or to arrest the fifth wheel hoisting action at any level up to the pre-set level at which the unit is automatically arrested.

These and several other objects of this invention will become apparent upon studying the following specification in conjunction with the drawings:

FIG. 5 is a greatly enlarged elevational view of the height control mechanism on the assembly in FIGS. 1, 2 and 3;

FIG. 6 is a diagrammatic view of the pneumatic system of this invention;

FIG. 7 is an enlarged, sectional view of the pneumatic system, particularly showing the operative valve components;

FIG. 8 is a sectional view of the manual control valve in FIG. 7, showing its position during the hoisting operation; and FIG. 9 is a sectional view of the valve in FIG. 8, showing its position for the lowering operation.

Figure 1:
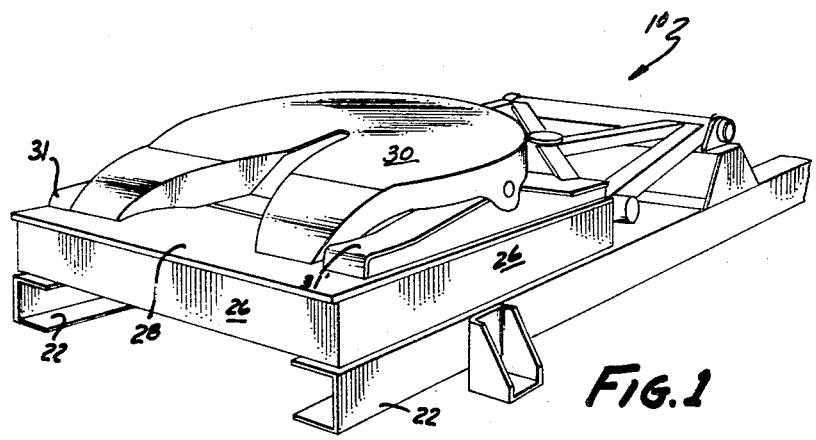
FIG. 1 is a perspective view of the novel fifth wheel system for the rear of a truck cab, viewed from the rear.
Figure 4:
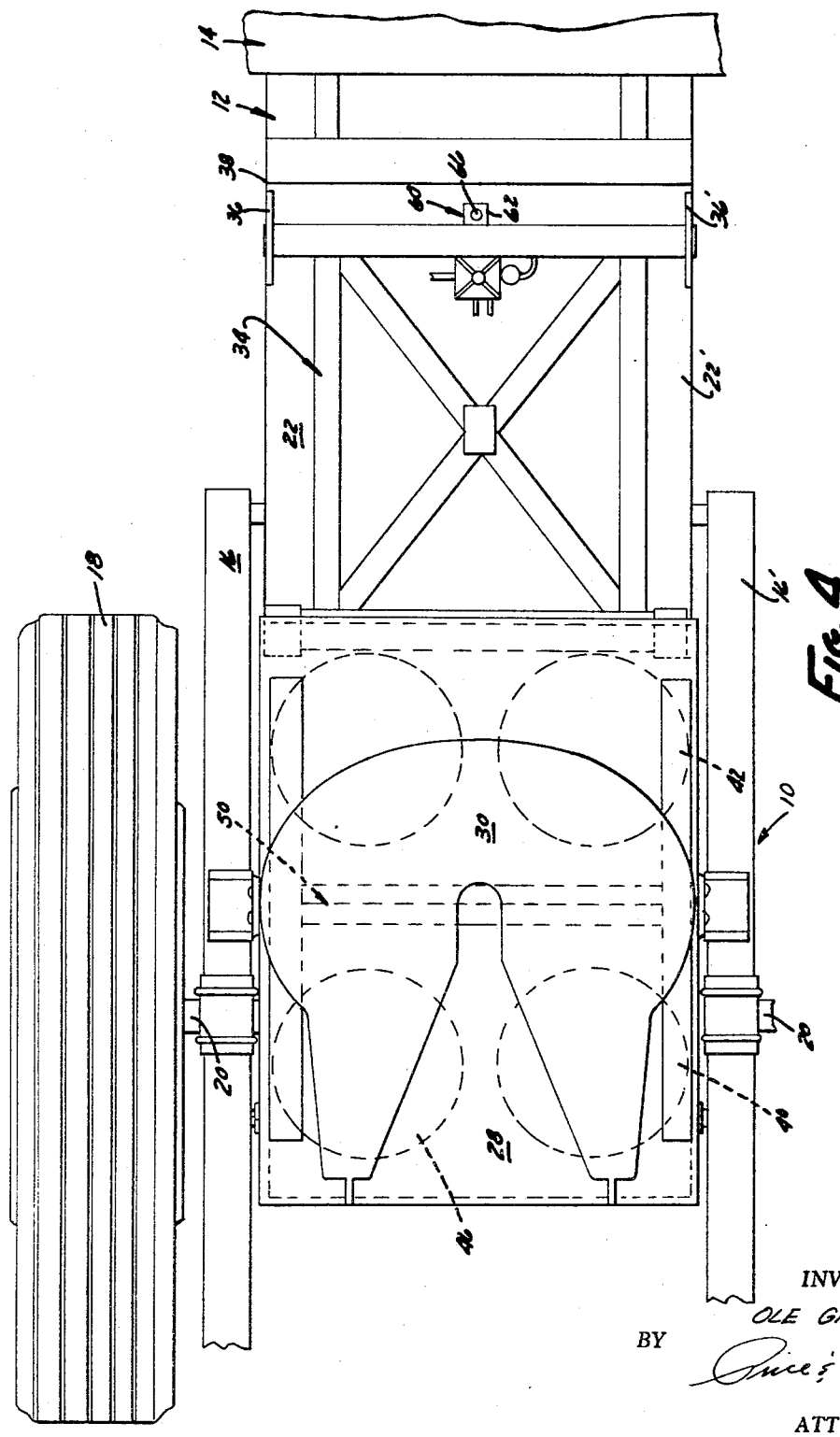
FIG. 4 is a plan view of the apparatus shown in its relation to a truck cab.

Referring now specifically to the drawings, in FIGS. 1 and 4 the complete controlled hoist assembly 10 includes a truck tractor having a frame 12 mounting a cab 14 and suspension means including springs 16 and 16', and wheels 18 on axle 20 connected to the frame.

The tractor frame 12 includes a pair of spaced parallel channel members 22 and 22'. Supported on the rear end portions of these channel members, and extending between them, is a horizontal bellows support platform 24 having an upstanding peripheral wall 26 extending therearound and terminating in a co-planar, upper support edge 26'. Normally resting upon support edge 26' is a fifth wheel supporting platform 28. The fifth wheel 30 is pivotally mounted on a transverse pivot axis to a pair of supports 31 and 31' on this platform. It has a conventional latch and control mechanism 32.

Mounted between inflatable bellows platform 24 and fifth wheel platform 28 is a plurality of four spaced upright inflatable sealed bellows-type air bags 40, 42, 44 and 46. These are enclosed within peripheral wall 26 when deflated and elevate fifth wheel platform 28 when inflated.

Extending transversely between platforms 24 and 28, and pivotally secured to the upper surface of platform 24 and to the lower surface of platform 28, between the front and rear pairs of bellows is a hinge assembly 50. This stabilizing hinge includes a first leaf 52 pivotally connected on its lower edge to platform 24 and pivotally connected on its upper edge to the lower edge of leaf 54, which in turn is pivotally connected on its upper edge to the underside of platform 28. The two hinge leaves 52 and 54 have mounted thereto adjacent their pivotal connection, a pair of edge abutting stop plates 56 and 58. The edges of these stop plates abut each other when the hinge opens to an angle short of 180°, so that the hinge will not move past center. This hinge unit provides lateral stabilization to the assembly during the hoisting and lowering operations.

Providing longitudinal stabilizing effect is the forwardly extending stabilizer framework 34 noted above. This framework, basically of rectangular configuration, has parallel pivot axes on its front edge and rear edges, transversely of the tractor frame. The rear pivot axis 35 is formed by the securement of the rear end of frame 34 to the underside front edge portion of fifth wheel platform 28. The front pivot axis 37 is formed by the pivotal connection of the cylindrical front end 39 of frame 34 to the upstanding support flanges 36 and 36' of transverse mount 38. This mount is secured between and to the fore and aft channel members 22 and 22' of the cab tractor frame. The rectangularly shaped stabilizer frame 34 includes a pair of diagonal reinforcing beams 41 and 43.

From the description given, it will be realized that inflation of hollow, sealed, bellows air bags 40, 42, 44 and 46 will elevate the fifth wheel platform 28 and thus, the fifth wheel assembly 30, causing the hinge assembly 50 to extend, and pivoting stabilizer frame 34. The hoisting of this assembly to a particular height is controlled by the novel control assembly preferably actuated by the pivotal operation of forward cylinder sleeve 39 of stabilizer frame 34.

Figure 2:
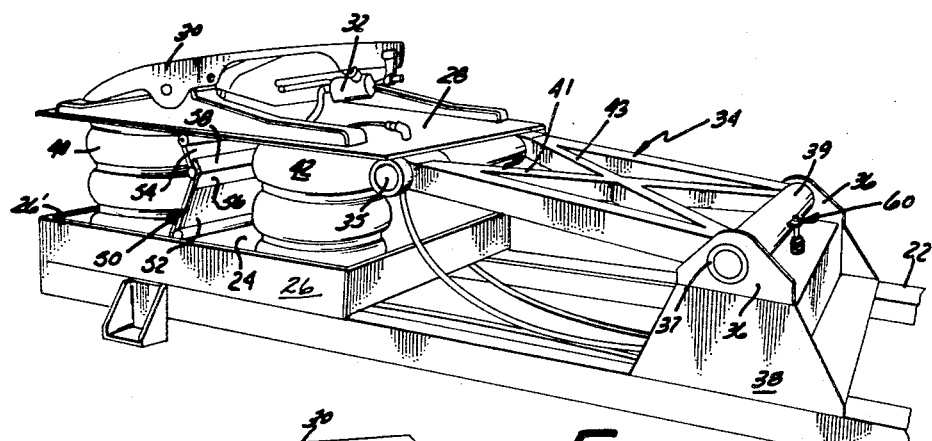
FIG. 2 is a side perspective view of the apparatus in FIG. 1.
Figure 3:
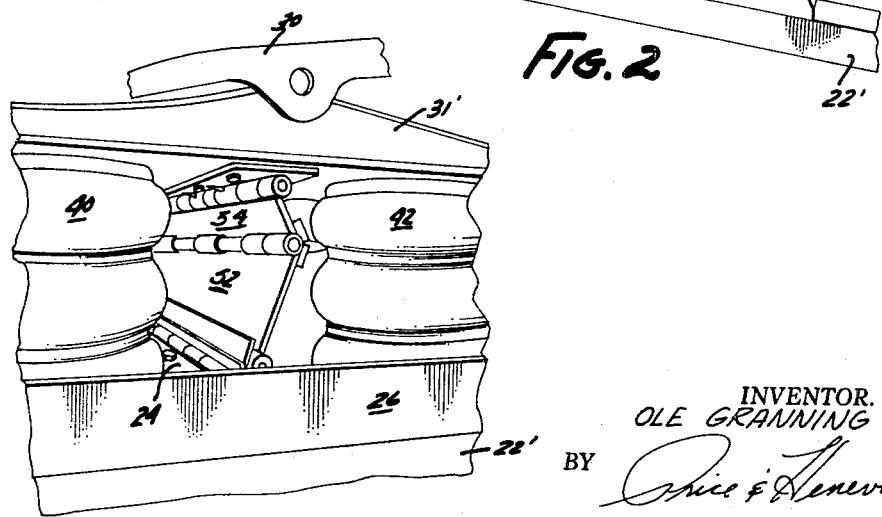
FIG. 3 is an enlarged, fragmentary, perspective view of a portion of the apparatus in FIG. 2.

More specifically, as the fifth wheel assembly is elevated, and the member 39 rotates angularly, a special actuator mechanism 60 (FIG. 2) illustrated in detail in FIG. 5 controls the pneumatic bellows inflation system. A rigid, radially extending flange 62 is welded or otherwise suitably secured to the periphery of sleeve 39. It contains a threaded orifice through which an adjustable actuator stud 64 is threaded and locked in place by a suitable nut 66. The head of this stud is in operable relationship with the head 68 of a valve plunger 70 that controls pneumatic valve 72 of the system. Rotation of sleeve 39 moves the stud from the dotted line position shown in FIG. 5 to the solid line position, to depress the head from its dotted line position to its solid line position, and thereby shift the spool of valve 72 in a manner to be described in detail hereinafter.

The pneumatic system includes a compressor 76 operated by the tractor engine, and an air pressure governor or regulator 78, both connected through respective conduits 80 and 82 to the brake tank 84. Brake tank 84 supplies the brakes of the vehicle (not shown) through brake line 86. It also communicates through line 88 to a reservoir tank 90. A check valve 85 is provided in line 88 to block line 88 when the air pressure in this line falls below a predetermined safe operating level, for example, 70 pounds, this insures that there will always be sufficient air pressure to operate the vehicle brakes. The reservoir tank communicates through line 92, T 94 and line 96, to a manual control valve 98. Valve 98 controls air pressure through line 100 to the fifth wheel latch operating unit 32 (FIG. 2) (forming no part of this invention). Valve 98 is located in the cab of the tractor. Also, control valve 104 for the novel system is located in the cab for actuation by the driver with valve handle 106 that controls the spool to be described hereinafter.

Control valve 104 communicates to the main supply tank 90 through line 92, communicates through line 107 to vent valve 108, and communicates through line 110 the height control valve 72, which in turn communicates through line 112 to the system main supply valve 114. Main supply valve 114 is connected to tank 90 through conduit 116, and through line 118 to a supply manifold 120. This supply manifold is also connected to exhaust valve 108 through line 122. The four bellows units 40, 42, 44 and 46 are connected to manifold 120 through respective lines 130, 132, 134 and 136.

Manual control valve 104 includes a rotatable spool 140 (FIG. 7) which can be shifted from the hold position illustrated in FIG. 7 to the hoisting position illustrated in FIG. 8, and to the lowering position illustrated in FIG. 9. When in the hold position, it exhausts line 110 and thus the control chamber 142 in valve 114 to the atmosphere through port 146, assuming that valve 72 is open between lines 110 and 112.

Valve 114 includes a valving member 150 movable in the housing, and normally biased by a spring 152 to a closed position to prevent pressurized air from supply tank 90 through line 116 from supplying manifold 120 to the bellows units. Shifting of valving member 150 by pressurized air through line 112 and into chamber 142 against the bias of spring 152 opens this valve to supply the pressurized air to the bellows unit.

Valve 108 is similar in construction to valve 114, with its valving member 160 being normally biased closed by a compression spring 162, and being shifted to an open position to allow air communication from manifold 120 to the air exhaust port 164 by actuation against the biasing spring 162 with pressurized air through conduit 106 into actuation chamber 168.

Very briefly, therefore, the lift system can be caused to elevate, hold or lower by rotation of the manual control valve 104 between the three positions illustrated respectively in FIGS. 8, 7 and 9. In addition, elevation of the system is automatically limited to a specific height by special control assembly 60 utilizing valve 72. This automatically stops the elevation and holds it there with valve 72 in a manner to be described.

The manual control system through valve 104 in the cab is initially actuated in order to elevate the fifth wheel platform and any trailer mounted thereon. This is achieved by turning the valve to the position illustrated in FIG. 8 so that pressurized air from the tank flows through conduit 92 and T 94 to pressure inlet port 141 of valve 104 and thence, out through its spool 140 to line 110. Since control valve 72 is normally in the position illustrated in FIG. 7 during hoisting, it allows direct communication from line 110 to line 112 to pressure chamber 142 in valve 114. This pressurized air then shifts valving member 150 against the bias of spring 152 to allow direct communication from the main air supply tank 90 through line 116 to manifold 120, and thence, through lines 130, 132, 134 and 136 to the respective bellows 40, 42, 44 and 46 to inflate them. Their inflation elevates the fifth wheel platform and fifth wheel assembly. During elevation, if the operator wishes to hold the fifth wheel at a particular elevation, he merely turns the spool of valve 104 to the position illustrated in FIG. 7. This causes exhausting of the pressurized air from chamber 142 in valve 114, and likewise exhausts any pressurized air from chamber 168 in the valve 108. Therefore, the two valves 114 and 108 are closed so that no additional air passes from the air supply tank to the bellows members, but since valve 108 is closed, these bellows members are not exhausted and just hold the pressure previously put into them. If he wishes to exhaust the system, the driver rotates valve 104 to the spool position illustrated in FIG. 9. This causes direct air flow communication from supply line 92 through inlet port 141 of valve 104, to line 106, and thus chamber 168 of valve 108. This opens valve 160 to allow pressurized air in the bellows units to pass through manifold 120 and valve 108 to exhaust port 164, and hence out to the atmosphere. Thus, the unit lowers.

In addition to these controls, if the bellows units inflates until stud members 64 on sleeve 39 rotates to shift plunger 70 of valve 72, portion 73 of member 70 closes the portion of this valve connecting air lines 110 and 112 to prevent further control air from line 110 to pressure chamber 142 in valve 114, and opens the lower portion 71 of valve 72 to exhaust line 112 and pressure chamber 142 to the atmosphere, allowing valving member 150 in valve 114 to close. This, therefore, prevents further air from the main supply tank from passing to the bellows units to prevent them from inflating further, and prevents the bellows units from deflating. The system thus automatically controls the maximum height of the fifth wheel assembly to prevent damage to the system, regardless of how much or little load is applied to the fifth wheel assembly by the particular trailer involved, whether loaded, partially loaded, or unloaded. Thus, damage to the fifth wheel assembly, the bellows units, the mounting plates on the top or bottom of the bellows units, and other related components such as the hinge mechanism is completely prevented automatically. The truck driver can, of course, adjust the particular bellows height at which this actuation occurs merely by rotating the stud member 64 in control means 60 (FIG. 5).

Various additional advantages to those specifically enumerated may occur to those in the art upon studying this description. It is also conceivable that certain minor details of construction may be modified from those specifically illustrated without departing from the unique concept presented. Hence, the invention is intended to be limited only by the scope of the appended claims and the reasonable equivalents thereto.

I claim:
1. A fifth wheel assembly comprising: a plurality of inflatable elements and support means therefor mountable to a truck tractor frame; a fifth wheel platform suspended on said inflatable elements, and a fifth wheel thereon; lateral and longitudinal stabilizing means for said platform; pressurized-air supply means for said elements, and air conduit means from said supply means to said element; manually controllable valve means in said conduit means shiftable between a first position allowing pressurized air supply to said elements, a second position maintaining constant the air supply in said elements, and a third position allowing exhaust of pressurized air from said elements; control valving means connected into said conduit means, including elevation limiting valve means shiftable from an inactive position to an active position overriding said manually controllable valve means to prevent further supply of air to said elements and close off said elements from exhaust to maintain the pressure in said elements, and pre-settable actuator means movable with elevation and lowering of said platform and cooperative with said elevation limiting valve means to shift it between its positions to thereby automatically limit the height of said fifth wheel when said manually shiftable valve means is in said first position.

2. A controlled pneumatically hoistable fifth wheel assembly for a truck tractor comprising: support means; hoistable hitch means including a fifth wheel hitch apparatus; inflatable bag hoist means between said support means and said fifth wheel hitch apparatus; air supply means to said bag hoist means including supply regulating valve means to said bag hoist means, and exhaust regulating valve means from said bag hoist means; manually operable control means operably associated with said supply regulating valve means and with said exhaust regulating valve means and shiftable between three positions of air supply, air retention, and air exhaust, for manual operator control of air flow to and from said bag hoist means; lateral and longitudinal stabilizing means between said fifth wheel hitch apparatus and said support means, shiftable with bag inflation-expansion and deflation-contraction; overriding control valve means operably associated with said supply regulating valve means and with said exhaust regulating valve means, and arranged, when shifted, to override said manually operable control means in said air supply position and cause said supply regulating valve means and said exhaust regulating valve means to close, to limit elevation of said fifth wheel hitch apparatus and valve actuating means on said stabilizing means operably positioned to so shift said control valve means at a predetermined height of said hoistable hitch means.

3. A fifth wheel assembly comprising: a plurality of inflatable elements and support means therefor mountable to a truck tractor frame; a fifth wheel platform suspended on said inflatable elements, and a fifth wheel thereon; lateral and longitudinal stabilizing means for said platform; pressurized-air supply means for said elements, and air conduit means including portions from said supply means to said elements; a normally closed, air operable supply valve in said conduit means normally closing off said elements from said supply means, a normally closed air operable exhaust valve in said conduit means to exhaust air from said elements when open; control line conduit means from said supply means to said supply valve and exhaust valve; manual control valve means in said control line conduit means to allow selective air actuation of one or the other or neither said supply and exhaust valves for inflation into, deflation from, or retention of air for said elements; height control overriding valve means in said control line conduit means shiftable between a first position allowing operating air to said supply valve through said manual control valve means to operate said supply valve for inflation of said elements, and a second position shutting off further operating air thereto and exhausting operating air on said supply valve to stop expansion of said elements.

References Cited

UNITED STATES PATENTS

| 2,733,931 | 2/1956 | Reid et al. | 280—440 |
| 2,903,256 | 9/1959 | Weiss. | |
| 2,919,930 | 1/1960 | Cislo. | |
| 2,928,684 | 3/1960 | Geiger. | |
| 3,074,739 | 1/1963 | Alfieri. | |
| 3,214,185 | 10/1965 | Mason et al. | 280—124 X |
| 3,253,840 | 5/1966 | Granning | 280—440 |

FOREIGN PATENTS 1,324,996  3/1963  France.

LEO FRIAGLIA, *Primary Examiner.*